US009537925B2

(12) United States Patent
Williamson et al.

(10) Patent No.: US 9,537,925 B2
(45) Date of Patent: Jan. 3, 2017

(54) BROWSER NOTIFICATIONS

(71) Applicant: GOOGLE INC., Mountain View, CA (US)

(72) Inventors: Peter H. Williamson, Kirkland, WA (US); Daniel Cheng, Kirkland, WA (US); Somas Thyagaraja, San Francisco, CA (US); Justin DeWitt, Mountain View, CA (US); Munjal Doshi, Sammamish, WA (US); Dmitry Titov, Kirkland, WA (US); Jennifer Braithwaite, Lynnwood, WA (US); Xiaoyong Liu, Mountain View, CA (US)

(73) Assignee: GOOGLE INC., Mountain View, CA (US)

(*) Notice: Subject to any disclaimer, the term of this patent is extended or adjusted under 35 U.S.C. 154(b) by 299 days.

(21) Appl. No.: 13/937,646

(22) Filed: Jul. 9, 2013

(65) Prior Publication Data

US 2015/0256415 A1  Sep. 10, 2015

(51) Int. Cl.
*G06F 11/14* (2006.01)
*H04L 29/08* (2006.01)

(52) U.S. Cl.
CPC .............. *H04L 67/02* (2013.01); *H04L 67/20* (2013.01); *H04L 67/34* (2013.01)

(58) Field of Classification Search
CPC ................................................... G06F 11/14
USPC ........................................................ 709/223
See application file for complete search history.

(56) References Cited

U.S. PATENT DOCUMENTS

| 2004/0158703 A1* | 8/2004 | Lund ............................ 713/150 |
| 2011/0314389 A1* | 12/2011 | Meredith et al. ............ 715/751 |
| 2012/0069131 A1* | 3/2012 | Abelow ..................... 348/14.01 |
| 2013/0046869 A1* | 2/2013 | Jenkins et al. ................ 709/223 |

OTHER PUBLICATIONS

"Android Cloud to Device Messaging Framework", Google Developers, retrieved from https://developers.google.com/android/c2dm/, Sep. 26, 2012, 9 pages.
"Web Browser", from Wikipedia, the free encyclopedia, retrieved on Jul. 6, 2013 from http://en.wikipedia.org/wiki/web_browser, 1 page.
Javaid, "Tango Video & Audio Chat Client Now Available for Windows", Oct. 1, 2011, 4 pages.

* cited by examiner

*Primary Examiner* — Vivek Srivastava
*Assistant Examiner* — Sibte Bukhari
(74) *Attorney, Agent, or Firm* — Brake Hughes Bellermann LLP

(57) ABSTRACT

A non-transitory computer-readable storage medium may comprise instructions stored thereon that, when executed by at least one processor, are configured to cause an intermediary server to at least receive, from a first client device, a first login request via a first browser installed on the first client device, the first login request identifying a user account, receive, from a third-party server, a message request, the message request including an identifier and indicating a browser application or a browser extension, map the identifier to the user account, determine whether the user account has installed the browser application or browser extension, and if the user account has installed the browser application or browser extension, send a first message to the first browser based on the message request.

18 Claims, 12 Drawing Sheets

BROWSER NOTIFICATIONS

TECHNICAL FIELD

This description relates to web browsers on computers.

BACKGROUND

Computing devices may connect each other via networks, such as the Internet. A user may access data from multiple locations, and from multiple computing devices.

SUMMARY

A client computing device may display push messages, synced notifications, and/or rich notifications. The push messages and/or synced notifications may originate from one or more third-party servers, and an intermediary server may receive the push messages and/or synced notifications from the one or more third-party servers and send the push messages and/or synced notifications to the client computing device. The client computing device may display the push messages, synced notifications, and/or rich notifications in a browser, such as a web browser. The browser may respond to a push message by launching a browser application or browser extension.

According to an example implementation, non-transitory computer-readable storage medium may comprise instructions stored thereon that, when executed by at least one processor, are configured to cause an intermediary server to at least receive, from a first client device, a first login request via a first browser installed on the first client device, the first login request identifying a user account, receive, from a third-party server, a message request, the message request including an identifier and indicating a browser application or a browser extension, map the identifier to the user account, determine whether the user account has installed the browser application or browser extension, and if the user account has installed the browser application or browser extension, send a first message to the first browser based on the message request.

According to another example implementation, a non-transitory computer-readable storage medium may comprise instructions stored thereon that, when executed by at least one processor, are configured to cause an intermediary server to at least receive, from a first client device, a first login request via a first browser installed on the first client device, the first login request identifying a user account, receive, from a second client device, a second login request via a second browser installed on the second client device, the second login request identifying the user account, receive, from a server, a message request, the message request including an identifier, map the identifier to the user account, and send a message to the first browser and the second browser based on the message request.

According to another example implementation, a non-transitory computer-readable storage medium may comprise instructions stored thereon that, when executed by at least one processor, are configured to cause a client device to at least log into an intermediary server via a browser installed on the client device, receive a first message from a third-party server via the intermediary server, the first message including an identifier of a browser application or a browser extension and a payload, and in response to receiving the first message, launch the identified browser application or browser extension within the browser and display information via the launched browser application or browser extension, the information being based on the payload.

According to another example implementation, a non-transitory computer-readable storage medium may comprise instructions stored thereon that, when executed by at least one processor, are configured to cause a client device to at least log into an intermediary server via a browser installed on the client device, receive a first message from a first third-party server via the intermediary server, the first message including an identifier of a browser application or a browser extension, in response to receiving the first message, launch the identified browser application or browser extension within the browser and display first information via the launched browser application or browser extension, receive a second message from a second third-party server via the intermediary server, the second message not identifying any browser application or extension, in response to receiving the second message, display second information via the browser, and in response to a local trigger, display third information via the browser.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
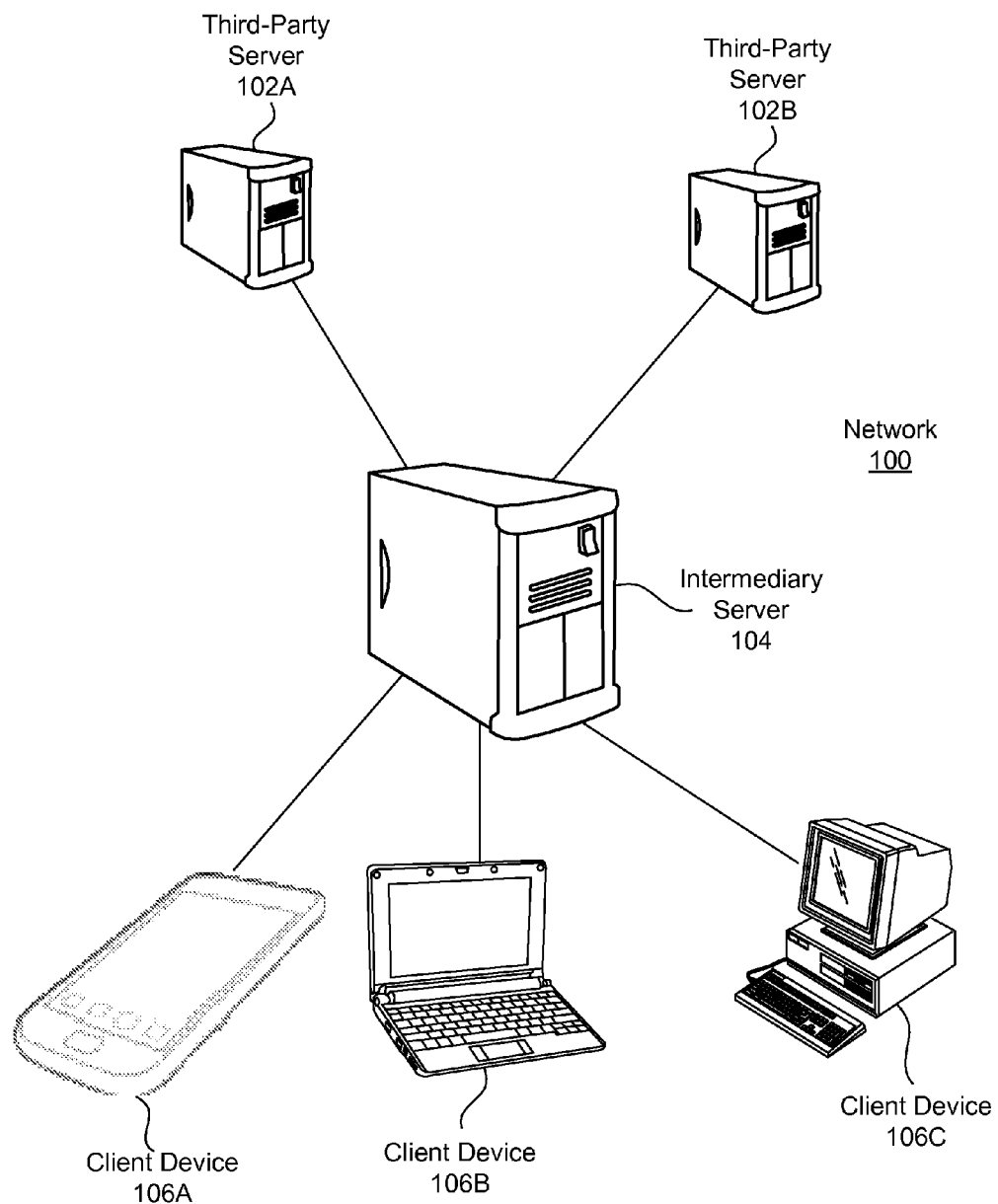
FIG. 1 is a diagram showing a network including third-party servers, an intermediary server, and client devices according to an example implementation.

FIG. 1 is a diagram showing a network 100 including third-party servers 102A, 102B, an intermediary server 104, and client devices 106A, 106B, 106C according to an example implementation. While two third-party servers 102A, 102B, one intermediary server 104, and three client devices 106A, 106B, 106C are shown in FIG. 1, any number of third-party servers 102A, 102B, intermediary servers 104, and client devices 106A, 106B, 106C may be included in the network 100. The network 100 may include any system for facilitating communication between computing devices, such as the Internet.

The third-party servers 102A, 102B may be owned and/or controlled by vendors who have contractual or other business relationships with an owner and/or controller of the intermediary server 104, or may be owned and/or controlled by the same owner and/or controller of the intermediary server 104. The third-party servers 102A, 102B may communicate with the intermediary server 104 via the network 100, and may communicate with the client devices 106A, 106B, 106C via the intermediary server 104. The third-party servers 102A, 102B may distribute and/or sell browser applications and/or browser extensions to users of the client devices 106A, 106B, 106C. The browser applications and/or browser extensions may include applications and/or extensions which function within, or extend features of, browsers such as web browsers running in the client devices 106A, 106B, 106C. The third-party servers 102A, 102B may also provide messaging services to users of the client devices 106A, 106B, 106C, such as providing users with stock updates.

The intermediary server 104 may maintain accounts on behalf of users of the client devices 106A, 106B, 106C. The intermediary server 104 may communicate with the client devices 106A, 106B, 106C via the network 100. The accounts may facilitate web-based applications, such as email, cloud-based computing such as word processing, spreadsheets, presentations, or calendars, cloud storage, games, or other applications. The intermediary server 104, which may include one or multiple servers, may maintain details of the users' accounts, and may store information on behalf of each user, as described further below.

The client devices 106A, 106B, 106C may include any computing device accessible by a user that includes a display and runs a browser. In the example shown in FIG. 1, the client device 106A includes a smartphone such as an Android™ phone or iPhone™, the client device 106B includes a laptop or notebook computer, and the client device 106C includes a desktop computer. However, the client devices 106A, 106B, 106C may include other types of computing devices that include displays and run browsers, such as tablet computing devices or thin clients. The client devices 106A, 106B, 106C may include network connections, such as Internet access, enabling them to communicate with the intermediary server 104.

Figure 2:
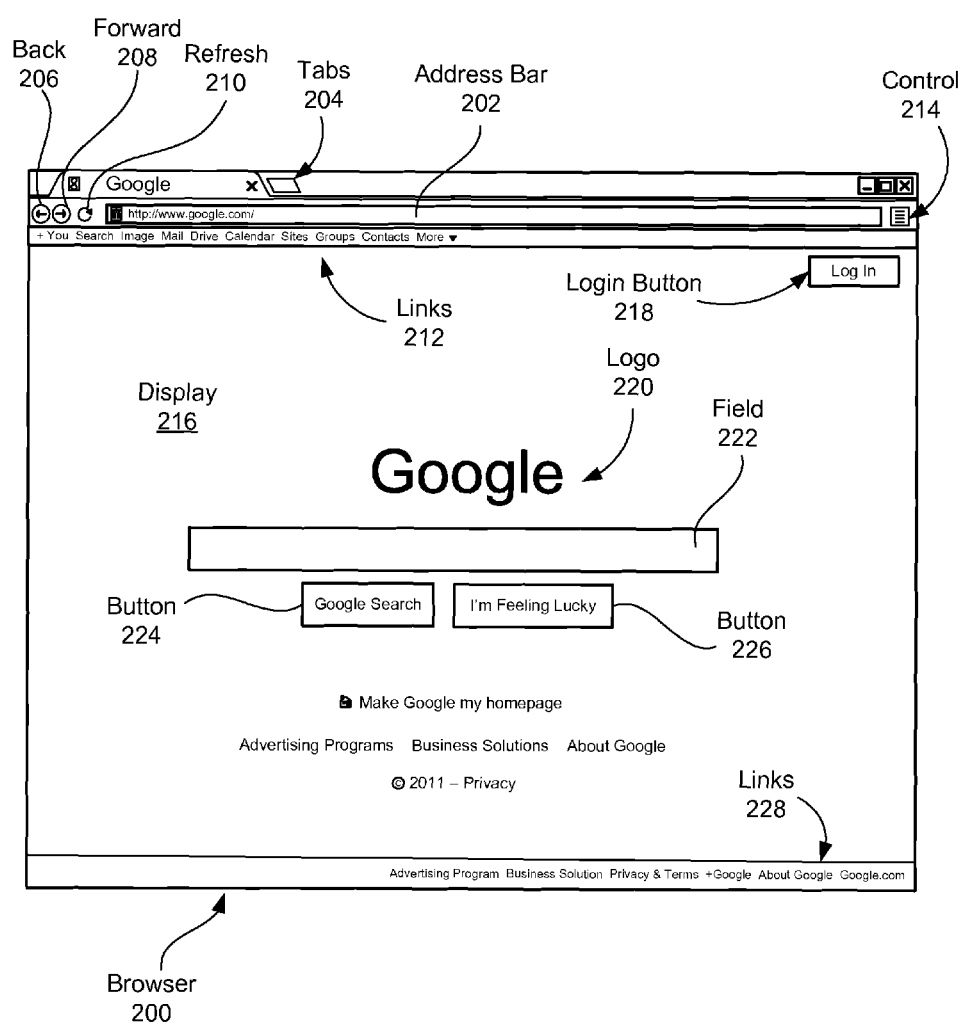
FIG. 2 is a diagram showing a browser according to an example implementation.

FIG. 2 is a diagram showing a browser 200 according to an example implementation. The browser 200 may include a web browser, and may include a software application installed on any of the client devices 106A, 106B, 106C (shown in FIG. 1) for retrieving information from a network such as the Internet including the World Wide Web, may present the retrieved information to a user, and may receive input from the user and send the input to other computing devices, such as the intermediary server 104 (shown in FIG. 1). The browser 200 may also run browser applications and/or browser extensions installed onto the browser 200 and/or the client device 106A, 106B, 106C on which the browser 200 runs. The browser 200 may include, for example, the Google Chrome™ browser, Firefox™ browser, Internet Explorer™ browser, or Safari™ browser, as non-limiting examples.

The browser 200 may include an address bar 202. The address bar 202 may include a field for receiving text from a user. The user may enter a Uniform Resource Locator (URL) into the address bar 202. The URL may identify a website that the user wishes to visit, and may be mapped to an Internet Protocol (IP) address by the browser 200 and/or another server in communication with the browser 200 according to the Domain Name System (DNS). The browser 200 may then send a request for information or data to the IP address, receive the information or data from a server associated with the IP address, and present or display the information or data to the user in a display 216 of the browser 216. The information or data may be displayed as a web page. In the example shown in FIG. 2, the URL is www.google.com, and a display 216 displays the Google™ home page.

The browser 200 may include a search field, or the search field may be incorporated into the address bar 202. A user may enter search terms into the search field, such as into the address bar 202, and the browser 200 may send the search terms to a search engine server. The search engine server may generate search results based on the search terms and send the results to the browser 200. The browser 200 may display the results of the search in the display 216.

The browser 200 may include one or multiple tabs 204. The tabs 204 may each be associated with a different web page displayed to the user. The user may select a tab 204 for display, and the web pages associated with non-selected tabs 204 may be hidden from the user. The user may hide and select tabs 204, thereafter selecting which web pages are displayed.

The browser 200 may include a back button 206, a forward button 208, and/or a refresh button 210. The back button 206, when clicked, may return the browser 200 to a previous page. The forward button 208, when clicked, may reverse the operation of the back button 206, returning the browser 200 to a page viewed before the back button 206 was clicked. The refresh button 210 may prompt the browser 200 to request information to be re-sent from the IP address associated with a current page, updating the displayed information.

The browser 200 may include links 212. The links 212 may include hyperlinks to favorite websites, or may include hyperlinks to applications run on the browser 200. In the example shown in FIG. 2, the links 212 may include links to an account associated with the user, a web search engine, an image search engine, a map application, a game website, a video website, a news website, an email website, a cloud storage website, a calendar application, and a menu for more browser applications and/or extensions.

The browser 200 may also include a control button 214. The control button 214 may open a menu presenting options to the user. The menu may include, for example, options to create a new tab 204, set bookmarks, print the data or information displayed in the webpage, manage, run, or delete browser applications or browser extensions installed on the browser 200, or change settings of the browser 200.

The browser 200 may also include the display 216. The display 216 may display or present data or information retrieved from a website and/or servers associated with a URL or IP address. The display 216 may display or present images, text, field, or hyperlinks, as non-limiting examples. The display 216 may be interactive, allowing the user to enter input which may be processed by the browser 200 and/or servers to which the browser 200 sends the input.

In the example shown in FIG. 2, the page displayed in the display 216 of the browser 200 includes a login button 218. The login button 218 may prompt the browser 200 to request the user to enter authentication information associated with a user account, such as a username and password. The user may enter the authentication information, and the browser 200 may send the authentication information to a server that stores the user's authentication information, such as the intermediary server 104. The sending of the authentication information to the intermediary server 104 by the browser 200 may be considered a login request.

The intermediary server 104 may compare the entered authentication information to authentication information stored by the intermediary server 104, or stored in a server in communication with the intermediary server 104. If the entered authentication information matches authentication information stored for a user, the intermediary server 104 may grant the login request, as described with respect to 606, 702, and/or 802 (shown in FIGS. 6, 7, and 8).

The granting the login request by the intermediary server 104 may include sending information associated with the user's account to the browser 200, such as bookmarks or favorite web pages, installed or purchased browser applications or browser extensions, or browser settings, as non-limiting examples. The browser 200 and/or client device 106A, 106B, 106C may install the browser applications or browser extensions upon grant of the login request, or the browser applications or browser extensions may have already been installed on the browser 200 and/or client device 106A, 106B, 106C. The receiving of the information associated with the user's account by the browser 200, and updating and/or modifying the browser 200 based on the received information, may allow the user to login to a browser 200 on any client device 106A, 106B, 106C and perform actions, such as web browsing, word processing, or interacting with browser applications or browser extensions as if he or she was on his or her original client device 106A, 106B, 106C.

The display 216 may include images. In the example shown in FIG. 2, the display 216 presents a logo, including the Google™ logo, as an image. The display 216 may also present one or more fields 222 to the user. In the example shown in FIG. 2, the field 222 includes a search field into which the user may enter search terms. The display 216 may also include buttons 224, 226. In the example shown in FIG. 2, the buttons 224, 226 include buttons to prompt searches based on the search terms entered into the field 222. The display 216 may also include links 228, such as hyperlinks to pages managed by an owner of the displayed web page.

Figure 3:
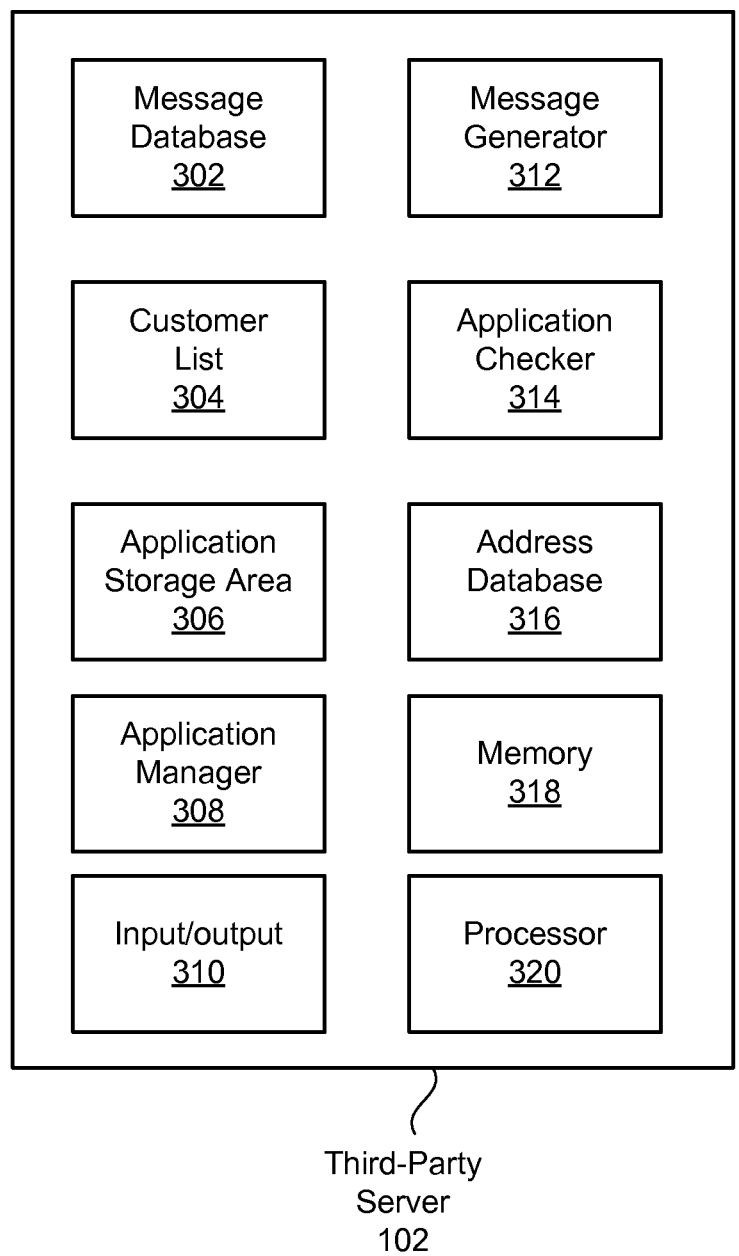
FIG. 3 is a diagram showing a third-party server according to an example implementation.

FIG. 3 is a diagram showing a third-party server 102 according to an example implementation. The third-party server 102 may include either of the third-party servers 102A, 102B shown in FIG. 1, or any other third-party server in communication with the intermediary server 104 (shown in FIG. 1) which provides browser applications and/or browser extensions to client devices 106A, 106B, 106C (shown in FIG. 1) and/or sends messages to client devices 106A, 106B, 106C via the intermediary server 104. While a number of modules are shown in the third-party server 102 of FIG. 3, any combination of these modules may be included, and more or fewer than those shown in FIG. 3 may be included, according to example implementations.

The third-party server 102 may include a message database 302. The message database 302 may include stored messages that the third-party server 102 will send to client devices 106A, 106B, 106C via the intermediary server 104. The stored messages may include push messages or synced notifications. The push messages may prompt a client device 106A, 106B, 106C to retrieve information or data from the intermediary server 104 and/or third-party server 102, and/or may prompt the client device 106A, 106B, 106C to launch a browser application or browser extension. The synced notifications may prompt the client device 106A, 106B, 106C to display information within display of the client device 106A, 106B, 106C without launching a browser application or extension. The information may be displayed inside the browser, or outside the browser, such as on a lower part of the display, according to an example implementation.

The third-party server 102 may send the stored messages, such as push messages or synced notifications, in response to predetermined events. The third-party server 102 may send the stored messages to the client devices 106A, 106B, 106C via the intermediary server 104 based on specific users logging into the intermediary server 104, and/or based on external events, such as a predetermined date and time occurring, a stock price reaching a predetermined level, or an opponent in a game performing a specified action.

The third-party server 102 may also include a customer list 304. The customer list 304 may include a list of customers who have purchased and/or downloaded browser applications or browser extensions from the third-party server 102, or who have joined certain groups or subscriptions, which may or may not involve payment of a fee. The customer list 304 may identify customers by a connection identifier (ID) and/or channel ID, which the intermediary server 104 may map to a customer account with further details about the customers, such as email address name, and demographic information. The customer may choose to provide or withhold information beyond the connection ID from the third-party server, according to an example implementation.

The third-party server 102 may also include an application storage area 306. The application storage area 306 may include browser applications and/or browser extensions available to customers either free or for a fee. The application storage area 306 may provide the browser applications and/or browser extensions to the intermediary server 104, and the intermediary server 104 may present browser applications and/or browser extensions from multiple third-party servers 102 to users of the client devices 106A, 106B, 106C for selection, purchase, download, and/or installation.

The third-party server 102 may include an application manager 308. The application manager 308 may manage the browser applications and/or browser extensions stored in the application store 306 and provided to the intermediary server 104. The application manager 308 may, for example, determine when certain events occur, such as stock prices reaching certain levels, dates and times stored in a calendar being reached, and/or may monitor and facilitate actions within an interactive online application, such as word processing applications or games.

The third-party server 102 may include a message generator 312. The message generator 312 may generate messages, such as push messages and/or synced notifications, to send to the client devices 106A, 106B, 106C. The message generator 312 may send messages to the client devices 106A, 106B, 106C via the intermediary server 104 based on the application manager 308 determining that certain predetermined events have occurred. The messages may include identifiers of the customers or users such as connection IDs and/or channel IDs, may include identifiers of web browsers or web extensions in the example of push messages, and/or payloads or data.

The third-party server 102 may include an application checker 314. The application checker 314 may check or determine which web browsers or web extensions a customer or user has downloaded and/or installed. The application manager 308 may determine whether to take action with respect to a customer or user and installed browser applications and/or extensions based on predetermined events, and the message generator 312 may determine whether to send messages to the logged-in customer or user, such as push messages and/or synced notifications.

The third-party server 102 may include an address database 316. The address database 316 may store addresses, such as IP addresses, of other computing devices, such as the intermediary server 104, to send messages to. The third-party server 102 may store the IP address of the intermediary server 104 (or more than one IP address of more than one intermediary server 104 in a distributed system), but may have no knowledge or record of IP addresses of the users or customers. The intermediary server 104 may protect the users' privacy by providing only a channel ID or connection ID to the third-party server 102A, 102B, and the intermediary server 104 will map the channel ID or connection ID received from the third-party server 102 to information associated with the user account.

The third-party server 102 may include one or more memory devices 318. The one or more memory devices 318 may include code or instructions, and may include data, such as data stored in association with any of the modules described with respect to FIG. 3. The one or more memory devices 318 may include one or more non-transitory computer-readable media storing instructions thereon that, when executed by at least one or more processors, are configured to cause the one or more processors to perform any of the functions or processes described herein with respect to the third-party servers 102, 102A, 102B.

The third-party server 102 may include at least one processor 320. The at least one processor 320 may be capable of executing instructions, such as instructions stored by the one or more memory devices 318, and may perform any of the functions or processes described herein with respect to the third-party servers 102, 102A, 102B.

The third-party server 102 may also include an input/output module 310. The input/output module 310 may include separate input and output devices, and/or may include devices which perform both input and output functions. The input/output module may include, for example, a display output, keyboard and mouse input, and/or network communication nodes for communicating with the intermediary server 104, such as twisted pair, coaxial cable, optical fiber, and/or one or more antennas for wireless transmission and reception.

Figure 4:
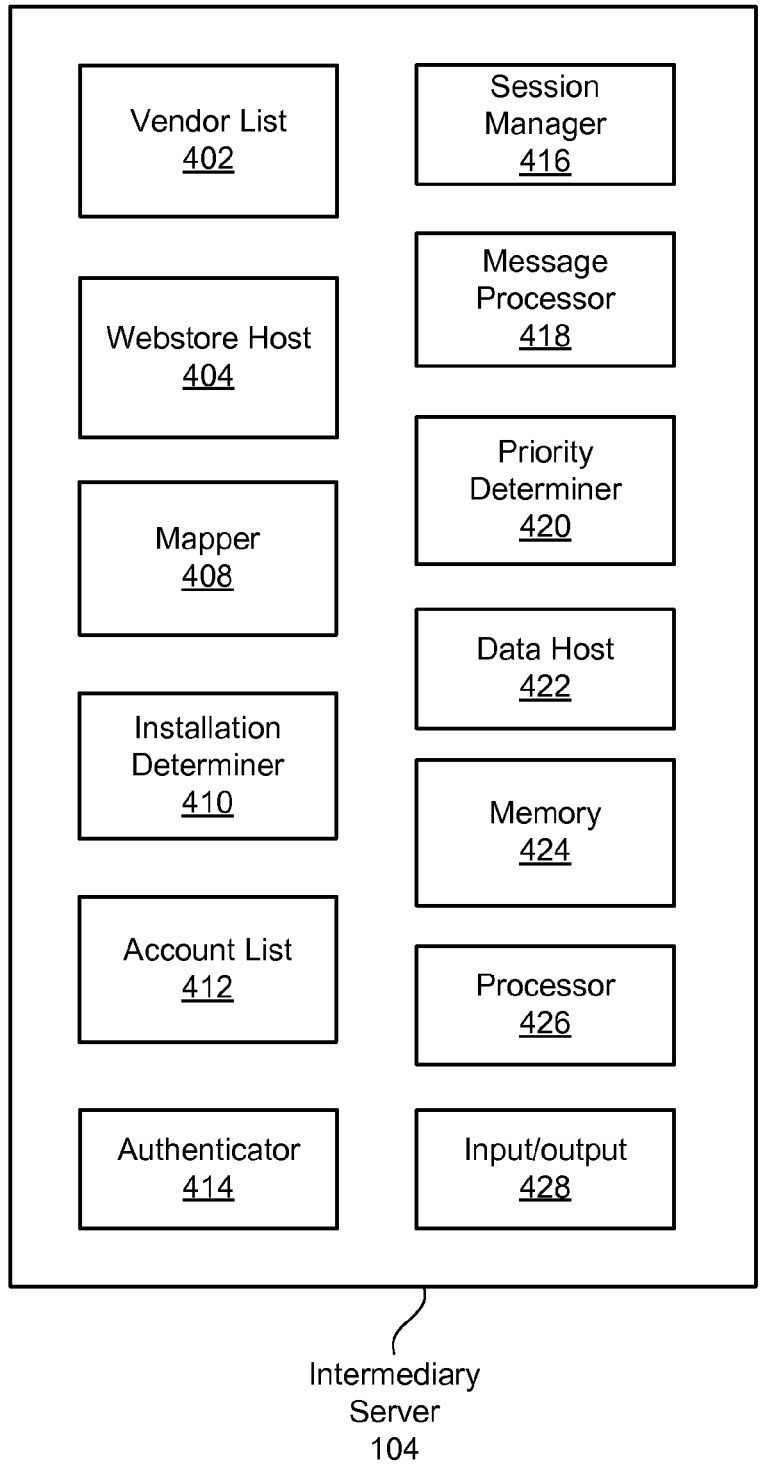
FIG. 4 is a diagram showing an intermediary server according to an example implementation.

FIG. 4 is a diagram showing the intermediary server 104 according to an example implementation. While a number of modules are shown in the third-party server 102 of FIG. 4, any combination of these modules may be included, and more or fewer than those shown in FIG. 4 may be included, according to example implementations. The functions described with respect to the intermediary server 104 may be performed by a single server, or may be distributed among multiple servers, according to example implementations. The intermediary server 104 may authenticate logins by users from client devices 106A, 106B, 106C, maintain the sessions after login, and interact with the third-party servers 102A, 102B.

The intermediary server 104 may include a vendor list 402. The vendor list 402 may include entities with which an owner of the intermediary server 104 has contractual or business relationships, such as to provide and manage browser applications and/or browser extensions. The vendor list 402 may include, for example, third-party servers 102A, 102B. The intermediary server 104 may check the vendor list 402 to determine which third-party servers 102A, 102B to communicate with regarding browser applications and/or browser extensions to include in a webstore, to notify regarding users logging in, and/or to facilitate sending or forwarding messages from the third-party servers 102A, 102B to the client devices 106A, 106B, 106C.

The intermediary server 104 may communicate with the third-party servers 102A, 102B to receive browser applications and/or browser extensions to include in a webstore, to notify regarding users logging in, and/or to facilitate sending or forwarding messages from the third-party servers 102A, 102B to the client devices 106A, 106B, 106C.

The intermediary server 104 may include a webstore host 404. The webstore host 404 may store browser applications or browser extensions received from the application store 306 of the third-party server 102. The webstore host 404 may also maintain a website at which client devices may select, purchase, and/or download browser applications and/or browser extensions on behalf of user accounts. The webstore host 404 may download the browser applications and/or browser extensions to the client device 106A, 106B, 106C upon selection or purchase by the user, and/or may download the browser applications and/or browser extensions to a client device 106A, 106B, 106C when a user logs into the intermediary server 104 via a client device 106A, 106B, 106B which has not previously downloaded and/or installed the browser application or browser extension. The webstore host 404 may also store which browser applications and/or browser extensions have been downloaded or installed by which user accounts, and/or on which machines or client devices. The webstore host 404 may be maintained on a same server as other modules shown in the intermediary server 104, or on a different server, according to example implementations.

The intermediary server 104 may include a mapper 408. The mapper 408 may map user IDs to connection IDs. The mapper 408 may map the connection ID or channel ID stored by the third-party server 102A, 102B to the user ID so that the intermediary server 104 may forward a message from the third-party server 102A, 102B to the user or customer.

The user IDs and connection IDs and/or channel IDs may be unique to each user or customer. Each user ID may be associated with only one user or customer account, and each connection ID and/or channel ID may be associated with only one user or customer account.

The intermediary server 104 may include an installation determiner 410. The installation determiner 410 may determine whether a user has installed a particular browser application or browser extension on his or her account, or whether the user has installed a particular browser application or browser extension on a particular machine via which the user has logged in to the intermediary server 104. The installation determiner 410 may notify a client device 106A, 106B, 106C via which, and/or from which, a user has logged in that the client device 106A, 106B, 106C has not installed a browser application or browser extension that the user has selected, and prompt the webstore host 404 to download the browser application or browser extension to the client device 106A, 106B, 106C. The webstore host 404 may also be maintained on a server other than the intermediary server 104, according to an example implementation.

The intermediary server 104 may include an account list 412. The account list 412 may include the user accounts of users or customers. The account list may include, for example, for each user account, the username, password, other authentication information, connection identifier, any personal information that the user chooses to provide, browser settings for the user, and/or browser applications and/or browser extensions selected or purchased by the user, as non-limiting examples.

The intermediary server 104 may include an authenticator 414. The authenticator 414 may authenticate, or not authenticate, a user at login. The authenticator 414 may, for example, check an entered username and password against a username and password stored in the account list 412. The authenticator 414 may also authenticate the user by other techniques, such as biometric authentication or token-based authentication, as non-limiting examples.

The intermediary server 104 may include a session manager 416. The session manager 416 may maintain a session with a client device 106A, 106B, 106C after the user has logged in. The session manager 416 may, for example, determine that messages received from an IP address from which an initial login request was received are received from the logged-in user, and may send messages to the IP address. The session manager 416 may also end the session if no messages are received from the IP address for a predetermined time, or if the user requests to log out. The communication between the intermediary server 104 and client device 106A, 106B, 106C may also be stateless, obviating any need for a session manager 416, according to an example implementation.

The intermediary server 104 may include a message processor 418. The message processor 418 may process and generate messages received and sent by the intermediary server 104. The message processor 418 may, for example, process and respond to messages received from the third-party servers 102A, 102B, and may send messages to the client devices 106A, 106B, 106C. The message processor 418 may also multiplex messages sent to the client devices 106A, 106B, 106C. The message processor 418 may multiplex the messages with, for example, cloud print messages, or cloud storage and/or shared drive messages. The messages may be multiplexed as a multiplexed data stream along a synchronization channel via which the intermediary server 104 communicates with the client devices 106A, 106B, 106C.

In an example implementation, the message processor 418 may send messages to each client device 106A, 106B, 106C via which the user is logged in and/or where the user is logged in. The third-party server 102A, 102B may send the messages to user accounts via the intermediary server 104, and the intermediary server 104 may multicast the messages to multiple client devices 106A, 106B, 106C via which each user account is logged in. For example, if the user has logged into the intermediary server 104 with the same user account on multiple client devices 106A, 106B, 106C, the message processor 418 may multicast the same message received from the third-party server 102A, 102B to each of the client devices 106A, 106B, 106C via which the user logged in using the same user account.

The intermediary server 104 may include a priority determiner 420. The priority determiner 420 may determine priorities of messages sent by the intermediary server 104. The priority determiner 420 may, for example, determine that messages that include payloads have a "best effort" priority, and messages without payloads have higher priority. The priority determiner 420 may also determine priorities of messages based on indications of priorities received from the third-party servers 102A, 102B.

The intermediary server 104 may also include a data host 422. The data host 422 may store data on behalf of user accounts. The data host 422 may, for example receive and/or upload data from the client devices 106A, 106B, 106C, store the data in association with the user account from which the data was received and/or uploaded, and, upon request, provide the data only to the user account with which the data is associated or stored. The data host 422 may also, upon instruction from the user account with which the data is associated, provide the data to other user accounts.

The intermediary server 104 may include one or more memory devices 424. The one or more memory devices 424 may include code or instructions, and may include data, such as data stored in association with any of the modules described with respect to FIG. 4. The one or more memory devices 424 may include one or more non-transitory computer-readable media storing instructions thereon that, when executed by at least one or more processors, are configured to cause the one or more processors to perform any of the functions or processes described herein with respect to the intermediary server 104.

The intermediary server 104 may include at least one processor 426. The at least one processor 426 may be capable of executing instructions, such as instructions stored by the one or more memory devices 424, and may perform any of the functions or processes described herein with respect to the intermediary server 104.

The intermediary server 104 may also include an input/output module 428. The input/output module 428 may include separate input and output devices, and/or may include devices which perform both input and output functions. The input/output module may include, for example, a display output, keyboard and mouse input, and/or network communication nodes for communicating with the third-party servers 102A, 102B and client devices 106A, 106B, 106C, such as twisted pair, coaxial cable, optical fiber, and/or one or more antennas for wireless transmission and reception.

Figure 5:
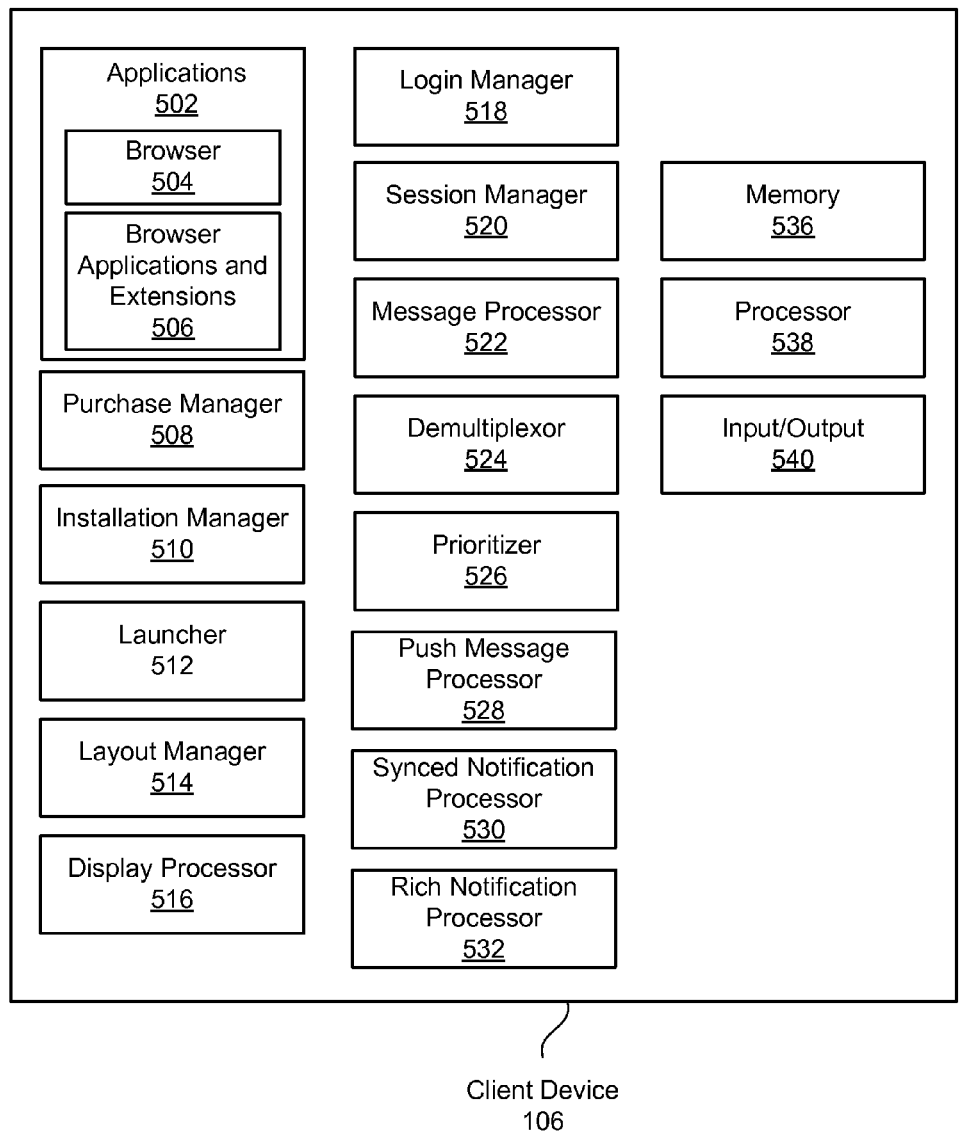
FIG. 5 is a diagram showing a client device according to an example implementation.

FIG. 5 is a diagram showing a client device 106 according to an example implementation. The client device 106 may include any of the client devices 106A, 106B, 106C described above. The client device 106 may run a browser, such as the browser 200 described above with respect to FIG. 2. The client device 106 may communicate with the intermediary server 104 and other servers such as the third-party servers 102A, 102B via the network 100, which may include the Internet. While a number of modules are shown in the third-party server 102 of FIG. 5, any combination of these modules may be included, and more or fewer than those shown in FIG. 5 may be included, according to example implementations.

The client device 106 may include applications 502. The applications 502 may include software programs that are installed on and run on the client device 106. The applications 502 may receive input from a user, perform functions and/or processes in response to the input, and provide output to the user.

The applications 502 may include a browser 504. The browser 504 may execute a browser 200 as shown and described with respect to FIG. 2. The applications 502 may also include browser applications and/or extensions 506. The browser applications and/or extensions 506 may include applications that run within the browser 504, and/or extensions that extend functions of the browser 504.

The client device 106 may include one or more purchase manager(s) 508. The purchase manager 508 may manage purchases by the user associated with the user account. The purchase manager 508 may, for example, store payment information such as credit card information and security information such as a password to facilitate payment. The purchase manager 508 may also store which applications 502 such as browser applications and/or extensions 506 were purchased with the user account. The purchase manager 508 may, for example facilitate downloading applications onto different client devices 106 than the purchases were made on. In an example implementation, a first purchase manager may manage purchases for the client device 106, and a second purchase manager may manage purchases for browser applications and/or browser extensions.

The client device 106 may also include an installation manager 510. The installation manager 510 may manage installation of applications 502 such as browser applications and/or extensions 506. The client device 106 may, for example, download browser applications and/or browser extensions 506 from the intermediary server 104, and the installation manager 510 may install the browser applications and/or browser extensions 506 on the client device 106. The installation manager 510 may perform the installation on different client devices 106 that the user logs into.

The client device 106 may include a launcher 512. The launcher 512 may launch applications 502, such as browser applications and/or extensions 506, on the client device. For example, when the client device 106 receives a push message identifying a browser application or browser extension, the launcher 512 may launch the identified browser application or browser extension 506. The launcher 512 may also include a first launcher that launches the operating system running on the client device 106, and a second launcher that launches the browser and/or browser applications.

The client device 106 may include a layout manager 514. The layout manager 514 may determine a layout to present information based on specifications of the client device 106, such as display size, pixel resolution, and other applications or images being displayed on the client device 106.

The client device 106 may include a display processor 516. The display processor 516 may determine how to display items on the display or output of the client device 106. For example, the display processor 516 may determine how to display the browser 200, 504 and any other applications or extensions 506 running on the client device 106.

The client device 106 may include a login manager 518. The login manager 518 may manage login requests by a user of the client device 106. The login manager 518 may, for example, receive and forward authentication information associated with a login request to the authenticator 414 of the intermediary server 104. The authentication information may include, for example, a username and password, and/or may include other information such as biometric information and/or token information received from an electronic key. The client device 106 may also include a first login manager that managers the user logging into an operating system of the client device 106, and a second manager that manages the user logging into the browser 200, 504.

The client device 106 may include a session manager 520. The session manager 520 may maintain a login session by the client device 106 with the intermediary server 104. The session manager 520 may, for example maintain the login session as long as the user does not exceed a predetermined time without providing any input to the browser 200, 504, or until the user chooses to exit or end the login session. The communication between the intermediary server and client device 106A, 106B, 106C may also be stateless, obviating any need for a session manager 520, according to an example implementation.

The login manager 518 and/or session manager 520 may enable a user to log in to the intermediary server 104 using multiple user accounts, and maintain login sessions for the multiple user accounts concurrently. By logging in and maintaining a login session using multiple user accounts, the user may access browser applications and browser extensions selected for and/or associated with each of the multiple user accounts, and may receive messages intended for each of the user accounts, according to an example implementation.

The client device 106 may include a message processor 522. The message processor 522 may process messages sent and received by the client device 106. The message processor 522 may, for example generate messages for the client device 106 to send to the intermediary server 104, and may process messages received from the intermediary server 104. The message processor 522 may identify a type of message received from the intermediary server 104. The message processor 522 may, for example, forward push messages to a push message processor 528 for further processing, and may forward synced messages to a synced message processor 530 for further processing.

The client device 106 may include one or more demultiplexers 524. The demultiplexer(s) 524 may demultiplex information or data received from the intermediary server 104 to provide messages to the message processor 522. The demultiplexer(s) 524 may, for example, demultiplex the messages such as push messages and synced notifications from the data stream among a synchronization channel from, for example, cloud print messages, or cloud storage messages. The demultiplexer(s) may also multiplex individual push messages to the browser application or browser extension identified in the push message.

The client device 106 may include a prioritizer 526. The prioritizer 526 may determine a priority of received messages. The prioritizer 526 may determine a priority based on a priority level indicated within the message, based on whether the message includes data and/or a payload, and/or based on a user's previous interaction with similar messages. For example, if the user tends to ignore similar messages, the prioritizer 526 may lower the priority of a message, whereas if the user tends to quickly interact with similar messages the prioritizer 526 may raise the priority of a message.

The prioritizer 526 may also determine how received messages are displayed based on the determined priority. For example, high priority messages may be displayed with larger images, in a middle of a display, and/or for a longer period of time, whereas lower priority messages may be displayed with smaller images, along edges such as a bottom of the display, and/or for a shorter period of time.

The client device 106 may also include the push message processor 528. The push message processor 528 may process push messages received from the intermediary server 104. Push messages may include, for example, an identifier of the user of the client device and identifier of a browser application or browser extension, and may include data and/or a payload. The push message processor 528 may process a push message by, for example, instructing the launcher 512 to launch the identified browser application or browser extension 506, and providing the data and/or payload (if included) to the launched browser application or browser extension 506. The push message processor 528 may also request data from the intermediary server 104. The push message processor 528 may, for example, include an application programing interface (API) configured to cause the client device 106 to perform the actions described herein with respect to push messages. The API may be present on the client device 106 as an interface between push messaging and a browser application or browser extension provided by a third-party server 102.

The client device 106 may also include the synced message processor 530. The synced message processor 530 may process synced notifications or messages received from the intermediary server 104. The synced notifications may identify the user and include data and/or a payload, but not identify any browser application or extension 506. The synced message processor 530 may, for example, cause the browser to display information based on the data and/or payload. The synced message processor 530 may cause the browser 200, 504 to display the information in a format determined by the layout manager 514. The synced message processor 530 may, for example, include an API configured to cause the client device 106 to perform the actions described herein with respect to synced notifications.

In an example implementation, the synced notifications may not include any data or payload, but may indicate a membership or subscription. For example, the synced notifications may indicate that the user has subscribed to receive a notification when a stock has reached a specified price. In this example, the synced message processor 530 may cause the browser 200, 504 to display a notification that the stock has reached the specified price.

The client device 106 may include a rich notification processor 532. The rich notification processor may process and/or generate rich notifications. Rich notifications may be generated locally within the client device 106, and not require communication with the intermediary server 104. Rich notifications may, for example include calendar alerts triggered by the client device's 106 internal clock, by a push message or a synced notification, or by content on a web page. Rich notifications may also include icons and/or text, an image, a list, or action buttons which receive input from the user. The rich notification processor 532 may cause the browser 200, 504 to display a rich notification based on a trigger internal to the client device 106, according to an example implementation. The rich notification processor 532 may, for example, include an application programing interface (API) configured to cause the client device 106 to perform the actions described herein with respect to rich notifications.

The client device 106 may include one or more memory devices 536. The one or more memory devices 536 may include code or instructions, and may include data, such as data stored in association with any of the modules described with respect to FIG. 5. The one or more memory devices 536 may include one or more non-transitory computer-readable media storing instructions thereon that, when executed by at least one or more processors, are configured to cause the one or more processors to perform any of the functions or processes described herein with respect to the client devices 106, 106A, 106B, 106C.

The client device 106 may include at least one processor 538. The at least one processor 538 may be capable of executing instructions, such as instructions stored by the one or more memory devices 536, and may perform any of the functions or processes described herein with respect to the client devices 106, 106A, 106B, 106C.

The client device 106 may also include an input/output module 540. The input/output module 540 may include separate input and output devices, and/or may include devices which perform both input and output functions. The input/output module may include, for example, a display output, keyboard and mouse input, and/or network communication nodes for communicating with the intermediary server 104, such as twisted pair, coaxial cable, optical fiber, and/or one or more antennas for wireless transmission and reception.

Figure 6:
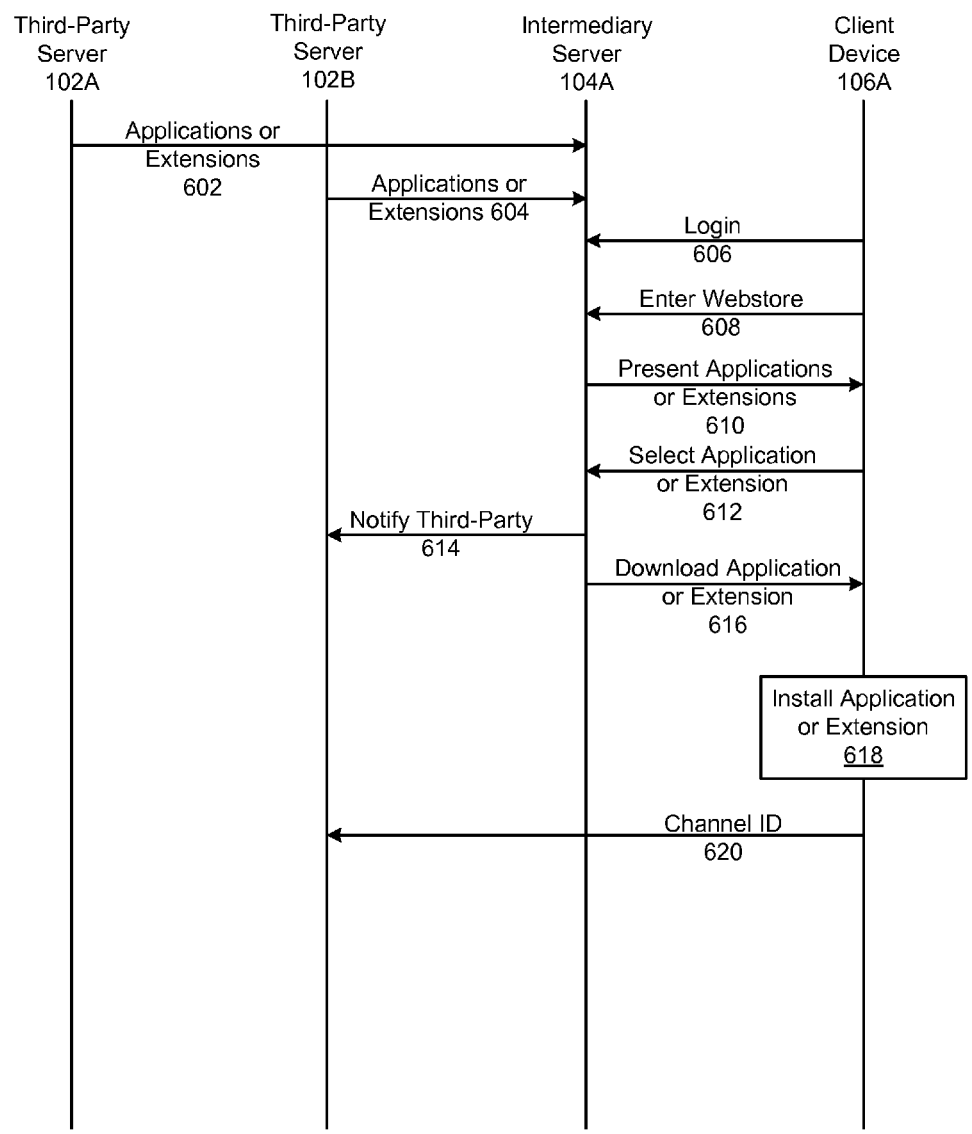
FIG. 6 is a timing diagram showing selection of a browser application or browser extension according to an example implementation.

FIG. 6 is a timing diagram showing selection of a browser application or browser extension according to an example implementation. In this example, the third-party servers 102A, 102B may provide applications or extensions 602, 604 to the intermediary server 104. While FIG. 6 shows the third-party server 102A providing its applications or extensions 602 to the intermediary server 104 before the third-party server 102B provides its applications or extensions 604 to the intermediary server 104, the third party servers 102A, 102B may provide their respective applications or extensions 602, 604 in any order, and may provide applications or extensions at multiple times, according to example implementations. The third-party servers 102A, 102B may, for example, provide applications or extensions 602, 604 from their respective application stores 306 (shown in FIG. 3) to the intermediary server 104, and the intermediary server 104 may store the applications or extensions 602, 604 in its webstore host module 404 (shown in FIG. 4).

Any of the client devices 106, 106A, 106B, 106C may thereafter select and/or purchase any number of the browser applications or browser extensions. While FIG. 6 shows the client device 106A selecting an application or extension, any of the user's client devices may be used to select an application or extension. Selection of an application or extension by one client device may be propagated to all of a user's client devices, so that all of the user's client devices have the same applications and extensions installed, according to an example implementation.

A user may login (606) to the intermediary server 104 via the client device 106A. The user may, for example, enter a username and password, and/or other authentication information, as described above with respect to the authenticator 414 of the intermediary server 104 and/or the login manager 518 of the client device 106.

After logging in, the client device 106A may enter the webstore (608). The webstore host 404 of the intermediary server 104 may send information to the client device 106A enabling the purchase manager 508 of the client device 106 to present the available browser applications and/or extensions to the user (610). The user may select an application or extension (612) from the webstore by, for example, clicking on an icon associated with a browser application or browser extension, and confirming the selection.

After the user has selected the browser application or browser extension (612), the intermediary server 104 may update records in the webstore host 404 of the intermediary server 104, and the intermediary server 104 may notify the third-party server 102B of the selection (614). The third-party server 102B may update its customer list 304 to reflect the selection.

The intermediary server 104 may download the browser application or browser extension to the client device 106A (616). The intermediary server 104 may, for example, send one or more files to the client device 106A. The installation manager 510 of the client device 106A may thereafter install the browser application or browser extension on the client device 106A (618). After installing the at least one browser application or browser extension (618), the client device 106A may generate and send a channel ID 620 to the third-party server 102. The client device 106A may use the channel ID 620 to communicate with the third-party server 102, such as to retrieve data, without allowing the third-party server 102 to acquire information about the client device 106A and/or user other than the connection ID and/or channel ID. If a user wishes to stop receiving push messages from the third-party server 102 based on a browser application or browser extension, the user may uninstall the browser application or browser extension.

Figure 7:
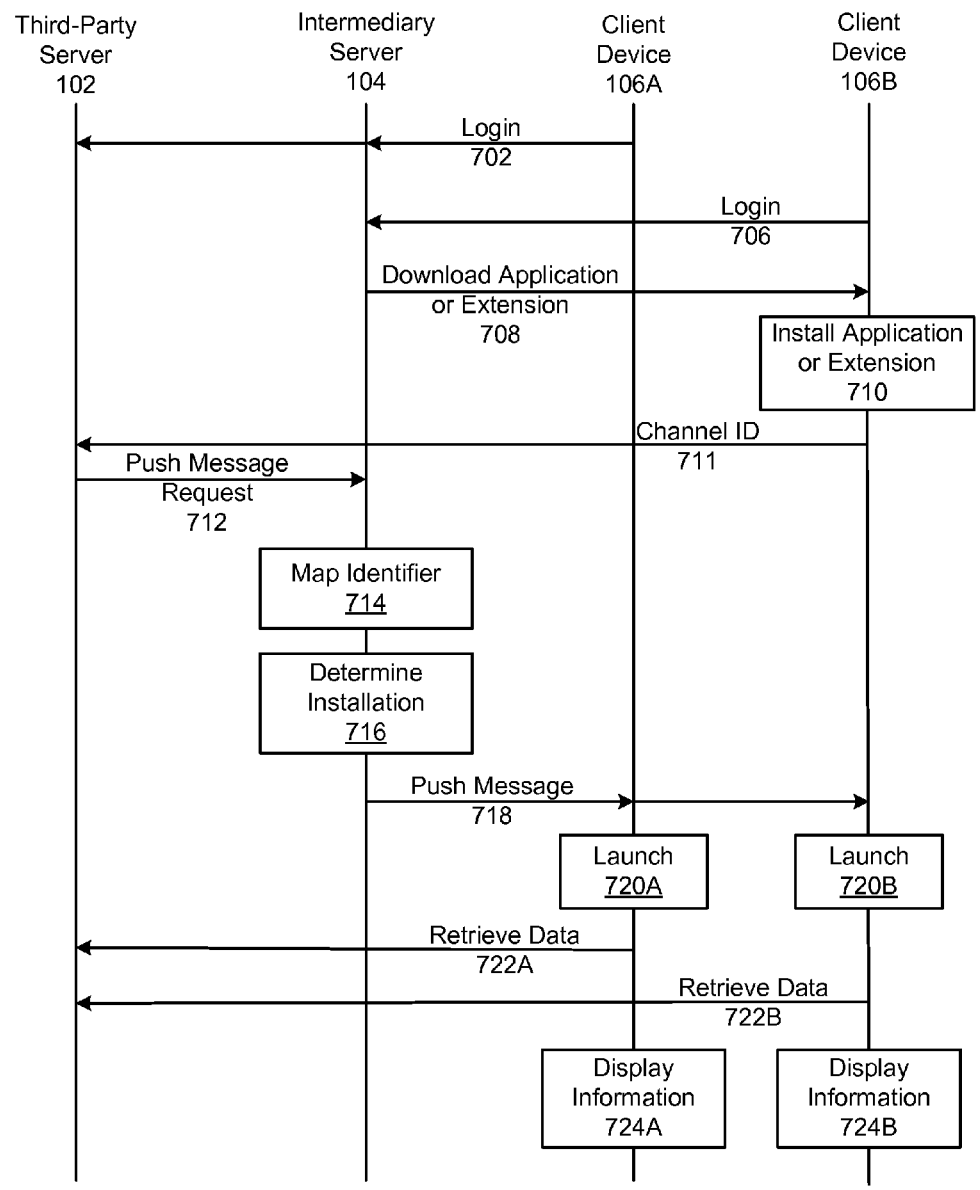
FIG. 7 is a timing diagram showing the third-party server send a push message to one or more client devices according to an example implementation.

FIG. 7 is a timing diagram showing the third-party server 104 send a push message to one or more client devices 106A, 106B according to an example implementation. A user may login to the intermediary server 104 via a first client device 106A (702). The user may login to the intermediary server 104 in a similar manner described above with respect to 606, 414, and 518. In response to the user logging in (702), the intermediary server 104 may notify the third-party server of the login (704) in a similar manner to the notification 614 described above.

In an example implementation, a user, who may be the same user who logged into the intermediary server 104 via the first client device 106A (702), may log in to the intermediary server 104 via a second client device 106B (706) with the same user account. The intermediary server 104 may recognize the same user account as being logged in via both the first client device 106A and the second client device 106B.

After the user has logged into the intermediary server 104 via the second client device 106B (706), the installation determiner 410 may determine that the second client device 106B has not downloaded and/or installed at least one browser application or browser extension that the user has selected via a different client device, such as via the first client device 106A. Based on determining that the second client device 106B has not downloaded and/or installed the at least one browser application or browser extension, the intermediary server 104 may download the at least one browser application or browser extension to the second client device 106B (708). In response to the intermediary server 104 downloading the at least one browser application or browser extension to the second client device 106B (708), the installation manager 510 of the second client device 106B may install the at least one browser application or browser extension (710). After installing the at least one browser application or browser extension (710), the second client device 106B may generate and send a channel ID 711 to the third-party server 102. The second client device 106B may use the channel ID 711 to communicate with the third-party server 102, such as to retrieve data, without allowing the third-party server 102 to acquire information about the second client device 106B and/or user other than the connection ID.

The third-party server 102 may send a push message request 712 to the intermediary server 104. The push message request 712 may include a connection ID and/or channel ID identifying the user, may identify a browser application or browser extension that the third-party server 102 provides and has been selected or downloaded by at least one of the client devices 106A, 106B associated with the user, and may or may not include a payload or data. The intermediary server 104 may send the push message to the client device 106A, 106B once the user has logged in.

The intermediary server 104 may respond to receiving the push message request 712 from the third-party server by mapping the connection ID and/or channel ID to the user account (714). The mapper 408 of the intermediary server 104 may, for example, map the connection ID included in the push message request 712 to the user ID, such as the email address.

The installation determiner 410 of the intermediary server 104 may determine whether the user has selected or installed the browser application or browser extension identified in the push message request (716). If the user has not selected or installed the identified browser application or browser extension, then the intermediary server 104 may send an error message to the third-party server 102 informing the third-party server 102 that the user has not selected or installed the browser application or browser extension identified by the push message request 712. If the user has selected the identified browser application or browser extension, but the identified browser application or browser extension has not been downloaded and/or installed on one or more of the client devices 106A, 106B via which the user is currently logged into the intermediary server 104, then the intermediary server 104 may download the identified browser application or browser extension to the client device 106A, 106B, and the client device 106A, 106B may install the downloaded browser application or browser extension. After the client device 106A, 106B has downloaded and installed the identified browser application or browser extension, the intermediary server may update the account list 412 to indicate that the client device 106A, 106B has installed the identified browser application or browser extension.

If the intermediary server 104 determines that the user has selected or installed the identified browser application or browser extension, either before the push message request 712 or after the push message request 712, then the intermediary server 104 may send a push message 718 to all client devices 106A, 106B logged in with the user account identified by the push message request 712 and/or mapped to from the connection ID included in the push message request 712. If the user is logged into the intermediary server 104 via a single client device 106A, 106B, then the intermediary server 104 may send the push message 718 to the single client device 106A, 106B. If the user is logged into the intermediary server 104 via multiple client devices 106A, 106B, then the intermediary server 104 may send the push message 718 to the multiple client devices 106A, 106B via which the user is logged into the intermediary server 104. If the user has not logged in yet, then the intermediary server 104 may store the push notification request until the user logs in, and send the push notification after the user logs in. The push message 718 may include an identifier of the user account, such as the username, logged into the intermediary server, an identifier of the browser application or browser extension identified by the push message request 712, and, if the push message request 712 included data or a payload, the push message 718 may include the data or payload.

The one or multiple client device(s) 106A, 106B that receives the push message 718 may respond to receiving the push message 718 by launching the browser application or browser extension identified by the push message 718 (720A, 720B). If the push message 718 included data or a payload, the client device(s) 106A, 106B may present the information included in the data or payload within the launched browser application or browser extension (724A, 724B).

In an example implementation, the push message 718 may be an invalidation message. The invalidation message may inform the client device(s) 106A, 106B that data or information on the client device(s) is not up-to-date or synchronized with data or information on the intermediary server 104 and/or third-party server 102, and that the client device(s) should update its data or information. The client device(s) 106A, 106B may update its data or information retrieving data from the intermediary server 104 or the third-party server 102 (722A, 722B). If the client device(s) 106A, 106B retrieves the data from the third-party server 102, the client device(s) 106A, 106B may retrieve the data using a connection ID and/or channel ID. The client device (s) 106A, 106B may have generated and sent the connection ID and/or channel ID to the third-party server 102 upon installation of a browser application or browser extension that processes and/or responds to push messaging (618, 711). Based on the retrieved data and/or the data or payload included in the push message 718, the client device(s) 106A, 106B may present the information included in the data or payload, and/or retrieved from the intermediary server 104, within the launched browser application or browser extension (724A, 724B).

Figure 8:
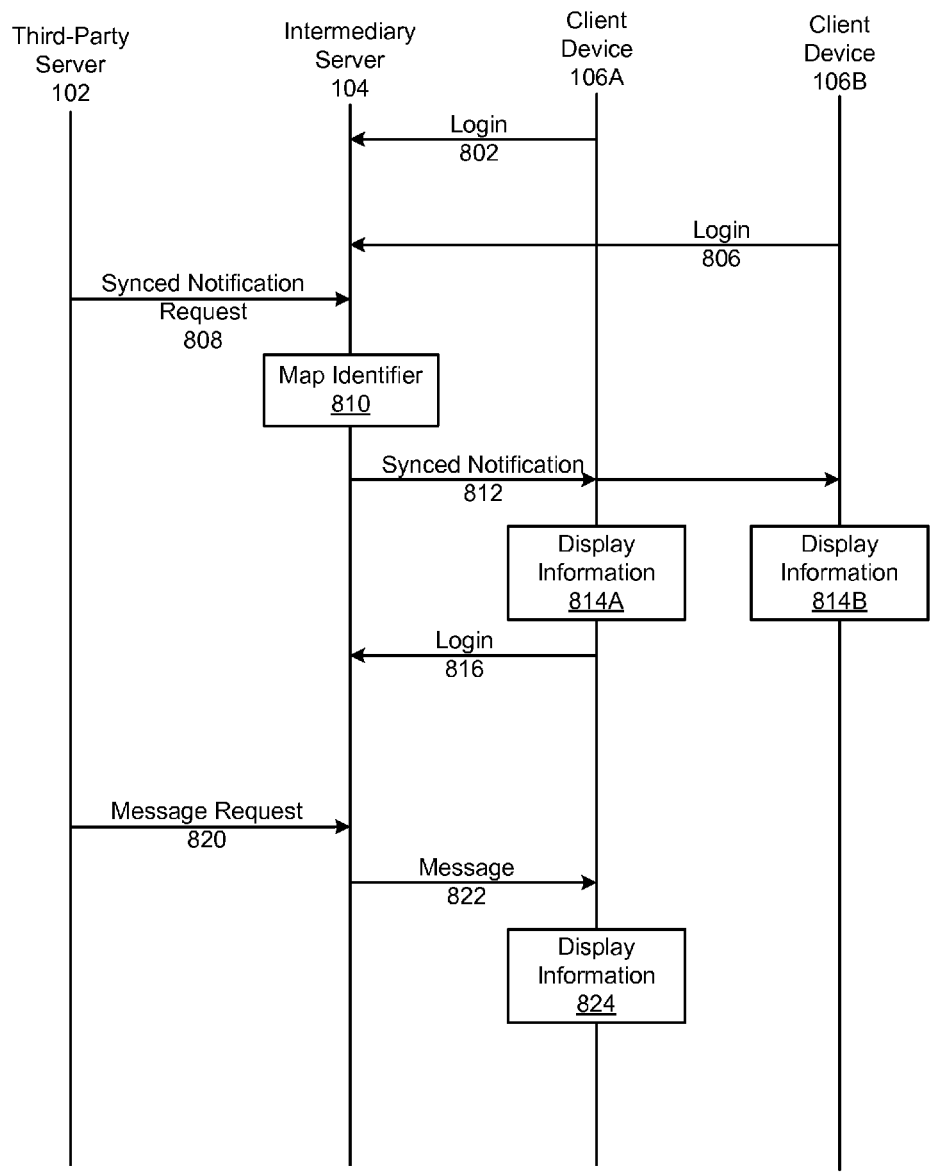
FIG. 8 is a timing diagram showing the third-party server send a synced notification to one or more client devices according to an example implementation.

FIG. 8 is a timing diagram showing the third-party server 104 send a synced notification to one or more client devices 106A, 106B according to an example implementation. A user may login to the intermediary server 104 via a first client device 106A (802), as described above with respect to 702, 606, 518, and/or 414. The user may also login to the intermediary server 104 via a second client device 106B (806), as described above with respect to 706, 606, 518, and/or 414.

The third-party server 102 may send a synced notification request 808 to the intermediary server 104. The synced notification request 808 may include an identifier of the logged-in user such as a connection ID, and may or may not include data or a payload.

Based on receiving the synced notification request 808 and the user having logged in (802, 806), the intermediary server 104 may respond to receiving the synced notification request 808 by mapping the identifier, such as the connection ID, to a user account such as a username which may include an email address (810). If the user has not logged in yet, then the intermediary server 104 may store the synced notification request until the user logs in, and send the synced notification after the user logs in. The user may receive the synced notification at each client device 106A, 106B via which he or she logs in, unless he or she dismisses the rich notification, in which case he or she will not receive it at any more client devices 106A, 106B.

The intermediary server 104 may send a synced notification 812 to all client devices 106A, 106B logged in with the user account identified by the synced notification request 808 and/or mapped to from the connection ID included in the synced notification request 808. If the user is logged into the intermediary server 104 via a single client device 106A, 106B, then the intermediary server 104 may send the synced notification 812 to the single client device 106A, 106B. If the user is logged into the intermediary server 104 via multiple client devices 106A, 106B, then the intermediary server 104 may send and/or multicast the synced notification 812 to the multiple client devices 106A, 106B via which the user is logged into the intermediary server 104.

The synced notification 812 may include an identifier of the user account, such as the username, logged into the intermediary server 104, an identifier of the third-party server 102 that sent the synced notification request 808, and, if the synced notification request 808 included data or a payload, the synced notification 812 may include the data or payload.

The one or multiple client device(s) 106A, 106B that receives synced notification 812 may respond to receiving the synced notification 812 by presenting or displaying the information included in the data or payload within the display of the client device(s) 106A, 106B (814A, 814B). The browser 200, 504 may display the information, but the information may be displayed either inside or outside the browser 200, 504. If the user had previously closed the browser 200, 504, the browser 200, 504 may have still been running as a background process on the client device(s) 106A, 106B. The synced notification 812 may prompt the browser 200, 504 to present or display the information included in the data or payload either inside or the browser 200, 504 or in a location on the display of the client device 106A, 106B which is outside the browser 200, 504.

In an example implementation, the user may login to the intermediary server 104 via a same client device 106A as the user logged into the intermediary server 104 (802) with a first user account, but using a different user account (816). The user may login to the intermediary server 104 via the first client device 106A (816), as described above with respect to 702, 606, 518, and/or 414, using a second user account. The user may then be logged into the intermediary server 104 via the client device 106A with two accounts. The client device 106A and intermediary server 104 may maintain the login session for both accounts concurrently.

The third-party server 102 may send a message request 820 to the intermediary server 104. The message request 820 may include a request for the intermediary server 104 to send either a push message or a synced notification to the user, as described above with respect to the push message request 712 and/or synced notification request 808. The intermediary server 104 may respond to the message request 820 as described above with respect to either the push message request 712 and/or synced notification request 808, and may map an identifier included in the message request 820 to a user account and/or determine whether an identified browser application or browser extension is installed in the client device 106A. If the user has logged in (816), the intermediary server 104 may send a message 822 to the client device 106A. If the user has not yet logged in, the intermediary server 104 may store the message request and send the message after the user has logged in.

The intermediary server 104 may send a message 822, such as a push message 718 or synced notification 812 described above, to the client device 106A. The client device 106A may respond to receiving the message 822, which may include a push message 718 or synced notification 812, by displaying information (824) based on the message 822. If the message 822 was a push message, then the client device 106A may launch a browser application or browser extension, may retrieve data from the intermediary server 104, and may display the information (824) within the browser application or browser extension as described above with respect to the push message 718. If the message 822 was a synced notification, then the client device 106A may display the information (824) within the browser 200, 504.

By logging into the intermediary server 104 with multiple user accounts via the same client device 106A, the user may receive messages intended for each user account for which the user logged in. The user may, for example, receive messages intended for his or her personal account, intended for his or her work account, and/or any other account(s).

Figure 9:
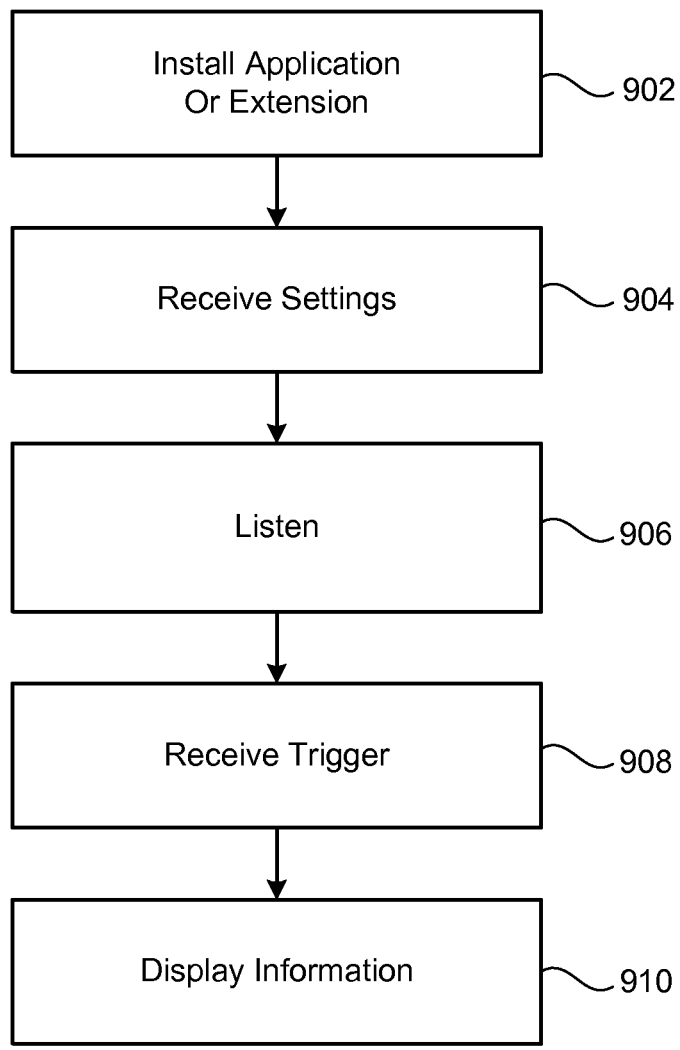
FIG. 9 is a flowchart showing a client device display a rich notification according to an example implementation.

FIG. 9 is a flowchart showing a client device display 106A, 106B, 106C a rich notification according to an example implementation. The client device 106A, 106B, 106C may install a browser application or browser extension that will display the rich notification (902). Or, the browser 200, 504 of the client device 106A, 106B, 106C may be preconfigured to display the rich notification.

The user may enter settings into the browser 200, 504 of the client device 106A, 106B, 106C, and the browser 200, 504 of the client device 106A, 106B, 106C may receive the settings (904). The browser 200, 504 of the client device 106A, 106B, 106C may, for example, receive dates and times to provide calendar alerts to the user.

The browser 200, 504 of the client device 106A, 106B, 106C, and/or any browser application or browser extension which will generate the rich notification, may listen for an external event that will trigger the rich notification (906). The browser 200, 504 of the client device 106A, 106B, 106C, and/or any browser application or browser extension may, for example, listen for a date and/or time maintained by the client device 106A, 106B, 106C.

The browser 200, 504 of the client device 106A, 106B, 106C, and/or any browser application or browser extension may receive a trigger (908). A received synced notification or API call by a browser application or browser extension may serve as a trigger for a rich notification. Upon receiving the trigger, the browser 200, 504 of the client device 106A, 106B, 106C, and/or any browser application or browser extension may display the rich notification (910). The browser 200, 504 of the client device 106A, 106B, 106C, and/or any browser application or browser extension may, for example, display a calendar alert. A type or template for displaying the rich notification may be determined by the browser 200, 504 and/or browser application or browser extension which displays the rich notification, and the type or template may be customized for the display of the client device 106A, 106B, 106C, such as based on the size of the display, number of pixels, and/or other images displayed.

Figure 10A:
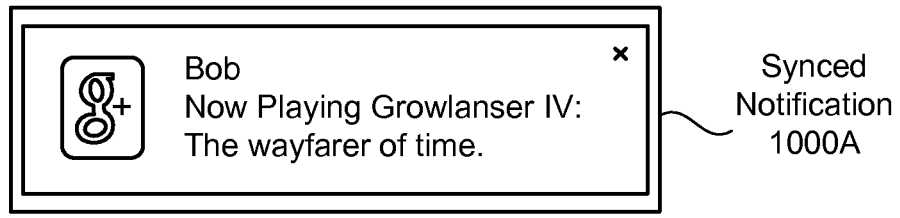
FIG. 10A shows a synced notification according to an example implementation.

FIG. 10A shows a synced notification 1000A according to an example implementation. In this example, the synced notification 1000A, which may be prompted by a synced notification 812 as shown in FIG. 8, and may be displayed in the browser 200 shown in FIG. 2, informs a user that a game, "Growlanser IV: The wayfarer of time," is being played.

Figure 10B:
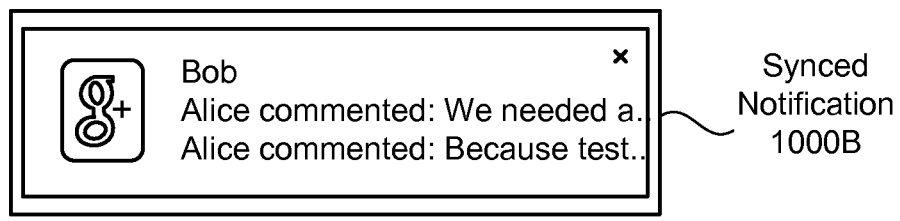
FIG. 10B shows a synced notification according to another example implementation.

FIG. 10B shows a synced notification 1000B according to another example implementation. In this example, the synced notification 1000A, which may be prompted by a synced notification 812 as shown in FIG. 8, and may be displayed in the browser 200 shown in FIG. 2, shows the user comments from another user who is a member of a chat group or another user who can see and/or comment on a post by a first user.

Figure 11A:
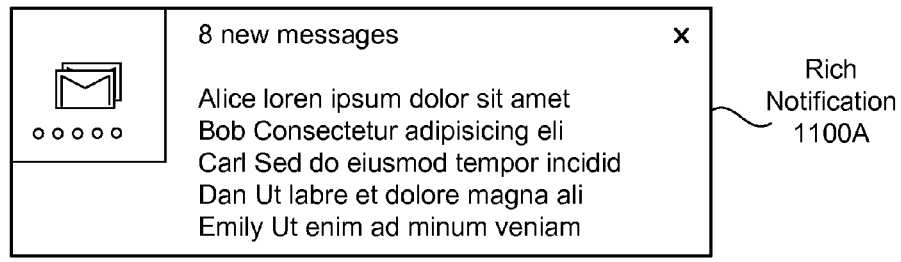
FIG. 11A shows a rich notification according to an example implementation.

FIG. 11A shows a rich notification 1100A according to an example implementation. In this example, the rich notification 1100A, which may be prompted by a received trigger (908) as shown in FIG. 9 and may be displayed in the browser 200 shown in FIG. 2, notifies the user of received messages.

Figure 11B:
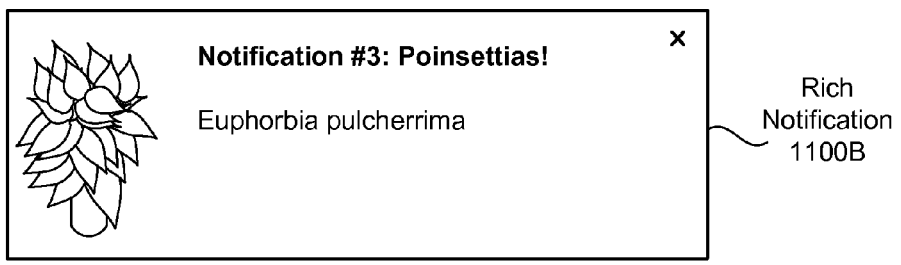
FIG. 11B shows a rich notification according to another example implementation.

FIG. 11B shows a rich notification 1100B according to another example implementation. In this example, the rich notification 1100B, which may be prompted by a received trigger (908) as shown in FIG. 9 and may be displayed in the browser 200 shown in FIG. 2, shows the user flowers. The rich notification 1100B may, for example, show the user a picture of flowers that another user posted or send to the user.

Figure 11C:
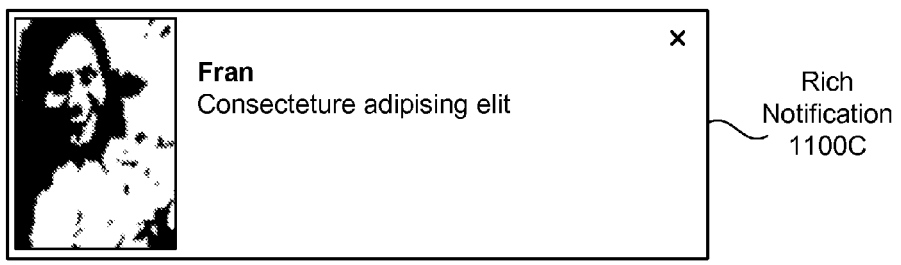
FIG. 11C shows a rich notification according to another example implementation.

FIG. 11 C shows a rich notification 1100C according to another example implementation. In this example, the rich notification 1100C, which may be prompted by a received trigger (908) as shown in FIG. 9 and may be displayed in the browser 200 shown in FIG. 2, shows a profile picture of another user. The rich notification 1100C may, for example, show the profile picture of the other user upon receiving a message from another user.

Figure 12:
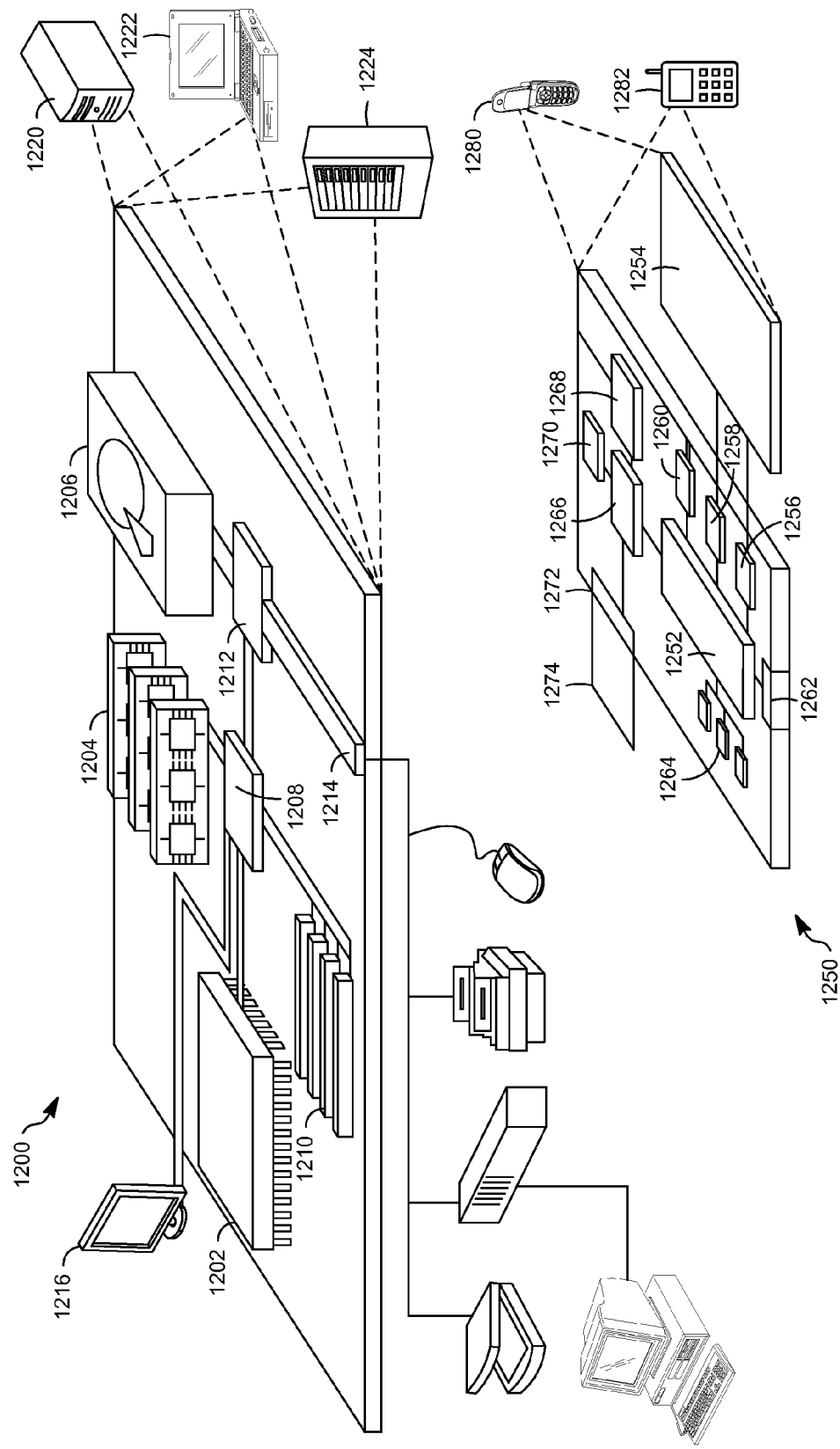
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provide in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provide as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause an intermediary server to at least:

receive, from a first client device, a first login request via a first browser installed on the first client device, the first login request identifying a user account;

receive, from a third-party server, a message request, the message request including an identifier and indicating a browser application running within the first browser or a browser extension extending a feature of the first browser;

map the identifier to the user account;

determine whether the user account has installed the browser application or browser extension; and based on the message request, if the user account has installed the browser application or browser extension:

multiplex a first message into a multiplexed data stream, the first message including a priority level and causing the client device to prioritize the message based on the priority level and instructing the first browser to access the browser application or browser extension and display information on the browser application or browser extension based on a payload included in the first message; and send the multiplexed data stream to a client device on which the first browser is running.

2. The non-transitory computer-readable storage medium of claim 1, wherein the user account is associated with an email address.

3. The non-transitory computer-readable storage medium of claim 1, wherein the determining includes checking a webstore to determine whether the user account has installed the browser application or browser extension.

4. The non-transitory computer-readable storage medium of claim 1, wherein the first message includes a username associated with the user account and an identifier of the browser application or browser extension.

5. The non-transitory computer-readable storage medium of claim 1, wherein the first message includes a username associated with the user account, an identifier of the browser application or browser extension, and the payload.

6. The non-transitory computer-readable storage medium of claim 1, wherein the first message instructs the first browser to retrieve data from the intermediary server or a third-party server.

7. The non-transitory computer-readable storage medium of claim 1, wherein the first message comprises an invalidation message instructing the first browser to retrieve data from the intermediary server or the third-party server.

8. The non-transitory computer-readable storage medium of claim 1, wherein the instructions are further configured to cause the intermediary server to send an error message to the third-party server if the user account has not installed the browser application or browser extension.

9. The non-transitory computer-readable storage medium of claim 1, wherein the instructions are further configured to cause the intermediary server to:

receive, from a second client device, a second login request via a second browser installed on the second client device, the second login request identifying the user account; and if the user account has installed the browser application or browser extension, send a second message to the second browser based on the message request.

10. The non-transitory computer-readable storage medium of claim 1, wherein the instructions are further configured to cause the intermediary server to:

receive, from the client device, a second login request via the first browser installed on the first client device, the second login request identifying a second user account;

receive, from a second third-party server, a second message request, the second message request including a second identifier and indicating a second browser application or a second browser extension;

map the second identifier to the second user account;

determine whether the second user account has installed the second browser application or second browser extension; and if the second user account has installed the second browser application or second browser extension, send a second message to the first browser based on the second message request.

11. A non-transitory computer-readable storage medium comprising instructions stored thereon that, when executed by at least one processor, are configured to cause an intermediary server to at least:

receive, from a first client device, a first login request via a first browser installed on the first client device, the first login request identifying a user account;

receive, from a second client device, a second login request via a second browser installed on the second client device, the second login request identifying the user account;

receive, from a server, a message request, the message request including an identifier and indicating a browser application running within the first browser and the second browser or a browser extension extending a feature of the first browser and the second browser;

map the identifier to the user account;

multiplex a message into a multiplexed data stream based on the message request, the message indicating the browser application or browser extension and instructing the first browser and the second browser to launch the browser application or browser extension and display information on the browser application or browser extension based on a payload included in the message; and send the multiplexed data stream to the first browser and the second browser.

12. The non-transitory computer-readable storage medium of claim 11, wherein the server comprises a third-party server.

13. A non-transitory computer-readable storage medium comprising instructions stored thereon that, when executed by at least one processor, are configured to cause a client device to at least:

log into an intermediary server via a browser installed on the client device;

receive a multiplexed data stream from a first third-party server via the intermediary server, the multiplexed data stream including a first message including an identifier of a browser application running within the browser or a browser extension extending a feature of the browser and a payload;

demultiplex the multiplexed data stream to process the first message;

based on the first message, launch the identified browser application or browser extension within the browser and display first information via the launched browser application or browser extension, the first information being based on the payload;

receive a second message from a second third-party server via the intermediary server, the second message not identifying any browser application or extension;

in response to receiving the second message, display second information via the browser; and in response to a local trigger, display third information via the browser.

14. The non-transitory computer-readable storage medium of claim 13, wherein the displaying the second information comprises indicating that email has arrived.

15. The non-transitory computer-readable storage medium of claim 13, wherein the instructions are configured to call the local trigger in response to receiving the second message.

16. The non-transitory computer-readable storage medium of claim 13, wherein the displaying the third information comprises displaying at least one of an icon and text, an image, a list, or action buttons.

17. The non-transitory computer-readable storage medium of claim 13, further comprising changing a priority of at least one of the first message, second message, or third message based on a user's previous interaction with information displayed in response to similar messages.

18. A method comprising:

receiving, by an intermediary server from a first client device, a first login request via a first browser installed on the first client device, the first login request identifying a user account;

receiving, from a third-party server, a message request, the message request including an identifier and indicating a browser application running within the first browser or a browser extension extending a feature of the first browser;

mapping the identifier to the user account;

determining whether the user account has installed the browser application or browser extension; and based on the message request, if the user account has installed the browser application or browser extension:

multiplexing a first message into a multiplexed data stream, the first message including a priority level and causing the client device to prioritize the message based on the priority level and instructing the first browser to access the browser application or browser extension and display information on the browser application or browser extension based on a payload included in the first message; and sending the multiplexed data stream to a client device on which the first browser is running.

* * * * *